May 31, 1960  R. A. FANTI  2,938,585

HIGH-LIFT PROPELLER BLADE SECTION

Filed Nov. 1, 1957

INVENTOR
ROY A. FANTI
BY Leonard F. Welchind
ATTORNEY

2,938,585

HIGH-LIFT PROPELLER BLADE SECTION

Roy A. Fanti, Springfield, Mass., assignor to United Aircraft Corporation, East Hartford, Conn., a corporation of Delaware Filed Nov. 1, 1957, Ser. No. 694,015

4 Claims. (Cl. 170—159)

This invention relates to variable pitch high-performance propellers and more particularly to propellers having blades of high-lift and low-drag characteristics.

The application of turboprop engines to high-speed subsonic aircraft has introduced new problems in the aerodynamic and structural design of propellers because of the extremely wide ranges of aerodynamic loading and relative Mach number over which the propeller airfoil sections operate. For example, in order to minimize aerodynamic losses and thereby obtain maximum propeller efficiency at design flight conditions, thin, low-camber airfoil sections must be used at the outer stations of the propeller blade. However, the use of these airfoil sections compromises the off-design operating conditions because of the inherent lower stall angles of these sections as compared to those of thick, high-camber propeller sections. Consequently, not only is the take-off thrust potential of the propeller reduced, but also the propeller becomes more susceptible to the single degree-of-freedom instability known as stall flutter.

It is therefore an object of this invention to provide an airfoil section for propeller blades which has high-lift potential and good lift-drag characteristics at both high and low speeds. These new airfoil sections have a trailing edge of specifically higher camber than that of the remaining upstream portion of the blade section. The utilization of these new type sections for propellers is advantageous for several reasons. One of these reasons is that the lift or thrust or horsepower absorbed at the onset of a stall-flutter condition is considerably increased over that of conventional types of propeller sections now employed in propeller blade design. In addition, the augmentation in lift or thrust or horsepower in itself which is possible by employing these new type of propeller sections is extremely desirable and results directly in the improvement of static thrust characteristics of the propeller or, in the design of smaller diameter and chord propellers, to produce the same output as the basic type configuration.

This airfoil shape for propellers can be described in general terms as the desired basic thickness distribution superposed or wrapped around a camber line characterized by having localized curvature or camber in the trailing edge region of the blade chord. This new camber line can be expressed explicitly in mathematical form to give the degree of curvature and chordal extent of curvature desired as determined by consideration of lift augmentation and lift-drag characteristics of these sections in order to obtain the optimum shape for the range of operation of the section.

These and other objects of this invention will become readily apparent from the following description of the drawing in which.

The development of new theoretical methods of evaluating complex airfoils has led to the discovery of the importance and efficiency of the particular group of propeller blade sections of this invention. This group of airfoils has high-load characteristics at low speed and low drag at high Mach numbers. In other words, this group of defined airfoils has high-lift potential and good lift-drag characteristics.

Figure 1:
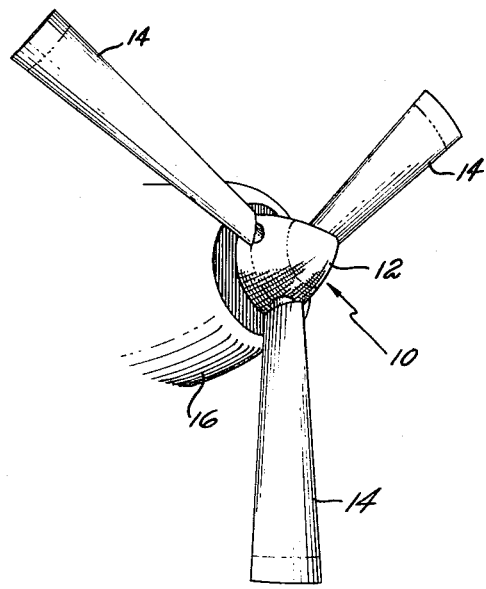
Fig. 1 is a perspective view of an aircraft propeller and power plant nacelle.

Referring to Fig. 1 a typical high-performance propeller is generally shown at 10 as having a hub and spinner combination 12. The hub includes a plurality of relatively thin blades whose pitch may be varied as, for example, fully shown and described in Patent No. 2,174,717 issued October 3, 1939, to Frank Caldwell et al.

Figure 2:
Fig. 2 is a cross section of a propeller blade illustrating a typical air foil section.
Figure 3:
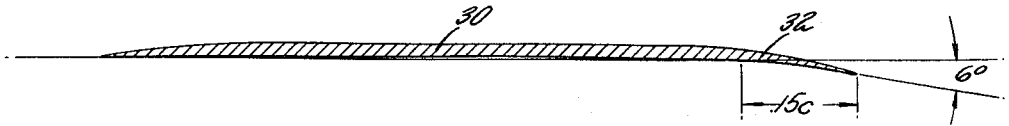
Figs. 3 and 4 are similar to Fig. 2 but illustrate modified airfoils at the extreme ends of the range of modification.
Figure 4:
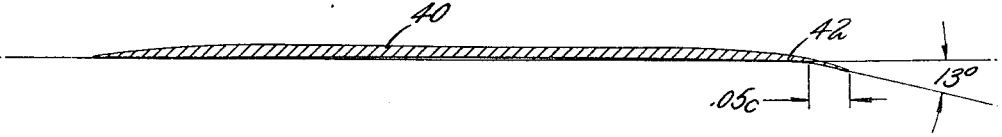

The cross section of each of the blades 14 represents a relatively thin airfoil having a large chord. This invention is particularly concerned with high-performance airfoils having a thickness-to-chord ratio in a range between 2% to 5%. These airfoils are relatively very thin and provide low drag at high Mach numbers. A typical airfoil of this type is shown in Fig. 2 and identified with the numeral 20. This airfoil substantially is an NACA 16202 airfoil. In its unmodified state such an airfoil may not provide the necessary high lift or loading at low speeds so that this airfoil according to this invention is modified as shown in Figs. 3 and 4. Fig. 3 shows that an airfoil 30 has adjacent the trailing edge thereof a portion 32 which is of greater positive camber than the remaining portion of the airfoil upstream thereof. Fig. 3 represents one extreme limit of the range specified for modifying the basic airfoil while Fig. 4 and airfoil 40 show a trailing edge portion 42 representing the other extreme of the range of modification of the airfoil. Depending upon the particular conditions for optimum operation, the airfoil thickness-to-chord ratios would vary as defined above along with the angle of departure of the camber line adjacent the trailing edge with respect to the mean camber of the remaining upstream portion of the airfoil.

Thus, for a thickness-to-chord ratio range of from 2% to 5% the relative angle of difference between the mean camber line and the trailing edge portion may vary between 6° and 13°. Similarly the extent of the trailing edge portion between these angle limits may vary from .15 to .05 of the chord of the basic airfoil.

Beyond these ranges the lift-drag characteristics of blades are not improved at transonic and supersonic speeds because of the significant increase in wave drag of these type sections in compressible flow.

It should be noted that the thickness-to-chord ratios mentioned are those primarily desired in the critical blade region which is located in the outboard 25% or less of the blade span. Likewise, although the increased camber of the blade trailing edge may readily extend throughout the blade span, it is preferable to provide such basic airfoil modification in said critical outboard 25% or less of the blade span.

Although only one embodiment of this invention has been illustrated and described herein, it will be apparent that various changes and modifications may be made in the construction and arrangement of the various parts without departing from the scope of this novel concept.

What is desired by Letters Patent is:

I claim:

1. In an aircraft propeller having a hub, a plurality of blades carried by said hub, each of said blades being substantially thin in cross section, and means for delaying the onset of stall flutter comprising a blade trailing edge portion which has a camber line deflected downwardly in relation to the mean camber line of the remainder of the blade section, said trailing edge portion being located in a chordwise region which comprises between the last 15% of the chord and the last 5% of the chord of the airfoil, said deflected camber line being deflected in a range between 6° and 13° from said mean camber line.

2. In an aircraft propeller having a hub, a plurality of low cambered blades carried by said hub, each of said blades being substantially thin in cross section and of low drag at high Mach numbers, and means for delaying the onset of stall flutter comprising for each of said blades a blade trailing edge portion which has a camber line at a downwardly deflected angle in relation to the mean camber line of the remaining upstream portion of the blade section, said trailing edge portion extending over a chordwise region between the last 15% of the chord and the last 5% of the chord of the airfoil, and said camber line of said trailing edge portion being deflected in an angle range relative to said mean camber line which range is between 6° and 13°.

3. In an aircraft propeller having a hub, a plurality of substantially low cambered blades carried by said hub, each of said blades being substantially thin in cross section, said blade cross section having a maximum thickness-to-chord ratio in a range of 2% to 5% in the region of the outboard 25% of the blade span or less than that portion of the span, and means for delaying the onset of stall flutter comprising for each of said blades a blade trailing edge portion which has a camber line at a downwardly deflected angle in relation to the mean camber line of the remaining upstream portion of the blade section, said trailing edge portion extending over a chordwise region between the last 15% of the chord and the last 5% of the chord of the airfoil, and said camber line of said trailing edge portion being deflected in an angle range relative to said mean camber line which range is between 6° and 13°.

4. In an aircraft propeller having a hub, a plurality of substantially low cambered blades carried by said hub, each of said blades being substantially thin in cross section, said blade cross section having a maximum thickness-to-chord ratio in a range of 2% to 5% in the region of the outboard 25% of the blade span or less than that portion of the span, and means for delaying the onset of stall flutter comprising for each of said blades a blade trailing edge portion which has a camber line at a downwardly deflected angle in relation to the mean camber line of the remaining upstream portion of the blade section, said trailing edge portion extending over a chordwise region between the last 15% of the chord and the last 5% of the chord of the airfoil, and said camber line of said trailing edge portion being deflected in an angle range relative to said mean camber line which range is between 6° and 13°, said trailing edge portion being deflected over only a portion of the outboard span of said blade.

References Cited in the file of this patent

UNITED STATES PATENTS

| | | |
|---|---|---|
| 1,463,556 | Reed | July 31, 1923 |
| 1,797,068 | Bocksruker | Mar. 17, 1931 |
| 2,041,849 | McCauley | May 26, 1936 |
| 2,306,177 | Mattson | Dec. 22, 1942 |

FOREIGN PATENTS

| | | |
|---|---|---|
| 365,940 | Great Britain | Jan. 28, 1932 |

OTHER REFERENCES

"Theory of Wing Sections," by Abbott and Von Doenhoff, pages 118 and 119, McGraw Hill Book Co., 1949.